US009120569B2

(12) United States Patent
Zygmant et al.

(10) Patent No.: US 9,120,569 B2
(45) Date of Patent: Sep. 1, 2015

(54) CLICKABLE CAMERA WINDOW

(75) Inventors: Thomas Zygmant, Southport, CT (US);
Jesse J. Lesperance, Harvest, AL (US);
Ira E. Zoock, Orange, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 283 days.

(21) Appl. No.: 13/565,344

(22) Filed: Aug. 2, 2012

(65) Prior Publication Data
US 2014/0236387 A1    Aug. 21, 2014

(51) Int. Cl.
*B64C 19/00*    (2006.01)
*B64C 39/02*    (2006.01)
*G05D 1/00*    (2006.01)

(52) U.S. Cl.
CPC ............ *B64C 39/024* (2013.01); *G05D 1/0038* (2013.01); *B64C 2201/146* (2013.01)

(58) Field of Classification Search
CPC . G05D 1/0044; G05D 1/0011; G05D 1/0202; G05D 1/101; B64C 2201/146; G08G 5/0069; G07C 5/008; G01C 23/00
USPC .......... 701/2, 23, 13, 32.3, 3, 36, 24, 28, 469; 244/75.1, 76 R, 158.4, 17.13, 189, 190; 463/37, 39; 446/454; 340/989; 348/114, 117; 434/14
See application file for complete search history.

(56) References Cited

U.S. PATENT DOCUMENTS

| | | | |
|---|---|---|---|
| 5,015,187 A | | 5/1991 | Lord |
| 5,240,207 A | * | 8/1993 | Eiband et al. ................ 244/190 |
| 6,694,228 B2 | | 2/2004 | Rios |
| 7,158,877 B2 | * | 1/2007 | Carlsson et al. ................. 701/2 |
| 7,418,261 B2 | * | 8/2008 | Forbes et al. ................ 455/431 |
| 7,693,617 B2 | | 4/2010 | Dockter |
| 7,693,624 B2 | | 4/2010 | Duggan |
| 7,731,588 B2 | | 6/2010 | Templeman |
| 8,082,074 B2 | | 12/2011 | Duggan |
| 2004/0193334 A1 | * | 9/2004 | Carlsson et al. ................. 701/9 |
| 2006/0253228 A1 | * | 11/2006 | Abraham et al. ................. 701/2 |
| 2007/0093945 A1 | * | 4/2007 | Grzywna et al. ............... 701/23 |
| 2010/0004798 A1 | * | 1/2010 | Bodin et al. ..................... 701/2 |
| 2010/0084513 A1 | * | 4/2010 | Gariepy et al. ............... 244/190 |
| 2010/0228418 A1 | * | 9/2010 | Whitlow et al. ............... 701/25 |
| 2011/0130897 A1 | * | 6/2011 | Gladysz et al. ................ 701/15 |
| 2011/0184590 A1 | * | 7/2011 | Duggan et al. ................... 701/2 |
| 2011/0288695 A1 | | 11/2011 | Gariepy |
| 2011/0301786 A1 | | 12/2011 | Allis |
| 2012/0179307 A1 | * | 7/2012 | Boorman et al. ................. 701/3 |
| 2012/0313768 A1 | * | 12/2012 | Campbell et al. ............. 340/438 |
| 2013/0179009 A1 | * | 7/2013 | Gershzohn ....................... 701/3 |

* cited by examiner

*Primary Examiner* — Marthe Marc-Coleman
(74) *Attorney, Agent, or Firm* — Cantor Colburn LLP

(57) ABSTRACT

Embodiments are directed to receiving, by a control station, an input including a command for re-location of a vehicle from a first location to a second location, the input identifying the second location, determining, by the control station, at least one of a distance, a direction, an altitude, and a latitude and longitude for the vehicle to travel from the first location to the second location, and transmitting, by the control station, the command and the at least one of a distance, a direction, an altitude, and a latitude and longitude to the vehicle.

11 Claims, 5 Drawing Sheets

CLICKABLE CAMERA WINDOW

BACKGROUND

When controlling an aircraft from a ground control station (GCS) or alternate control device, it may be difficult to obtain a sense or understanding of the surrounding environment. It may prove difficult to obtain an environmental awareness regarding, e.g., what is below the aircraft, given a depth of field from a distance.

When considering an optionally piloted vehicle (OPV), an unmanned aerial vehicle (UAV) with no crew aboard, or a piloted aircraft with blind zones, the difficulty encountered in terms of depth of field and situational awareness may play a significant role. For example, having an understanding of the depth of field may play a role during aircraft operations, such as load pickup or drop-off and aircraft landing.

In order to maneuver an aircraft, remote operations have relied on joystick or other control input mechanisms. The operator adjusts a direction of the aircraft, monitors the status of the aircraft's flight, and then adjusts the direction again in order to have the aircraft arrive at a destination. Such techniques result in frequent engagement by the operator, are prone to operator/human error, susceptible to latency, are time consuming, are taxing on an operator, and impose increased stress on the aircraft based on quick or rapid changes in terms of movement.

BRIEF SUMMARY

An embodiment is directed to a method comprising receiving, by a control station, an input including a command for re-location of a vehicle from a first location to a second location, the input identifying the second location, determining, by the control station, at least one of a distance, a direction, an altitude, and a latitude and longitude for the vehicle to travel from the first location to the second location, and transmitting, by the control station, the command and the at least one of a distance, a direction, an altitude, and a latitude and longitude to the vehicle.

An embodiment is directed to an apparatus comprising at least one processor, and memory storing instructions that, when executed by the at least one processor, cause the apparatus to: receive an input including a command for re-location of an aircraft from a first location to a second location, the input identifying the second location, determine at least one of a distance, a direction, and a latitude and longitude for the aircraft to travel from the first location to the second location, and transmit the command and the at least one of a distance, a direction, and a latitude and longitude to the aircraft.

An embodiment is directed to a system comprising a control station comprising a touchscreen configured to receive a one-touch input that includes a command for re-location of at least one of an optionally piloted vehicle (OPV) and an unmanned aerial vehicle (UAV) from a first location to a second location and identifies the second location, determine at least one of a distance and new latitude and longitude for the at least one of an OPV and a UAV to travel from the first location to the second location, and transmit the command and the at least one of a distance and new latitude and longitude.

Other embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
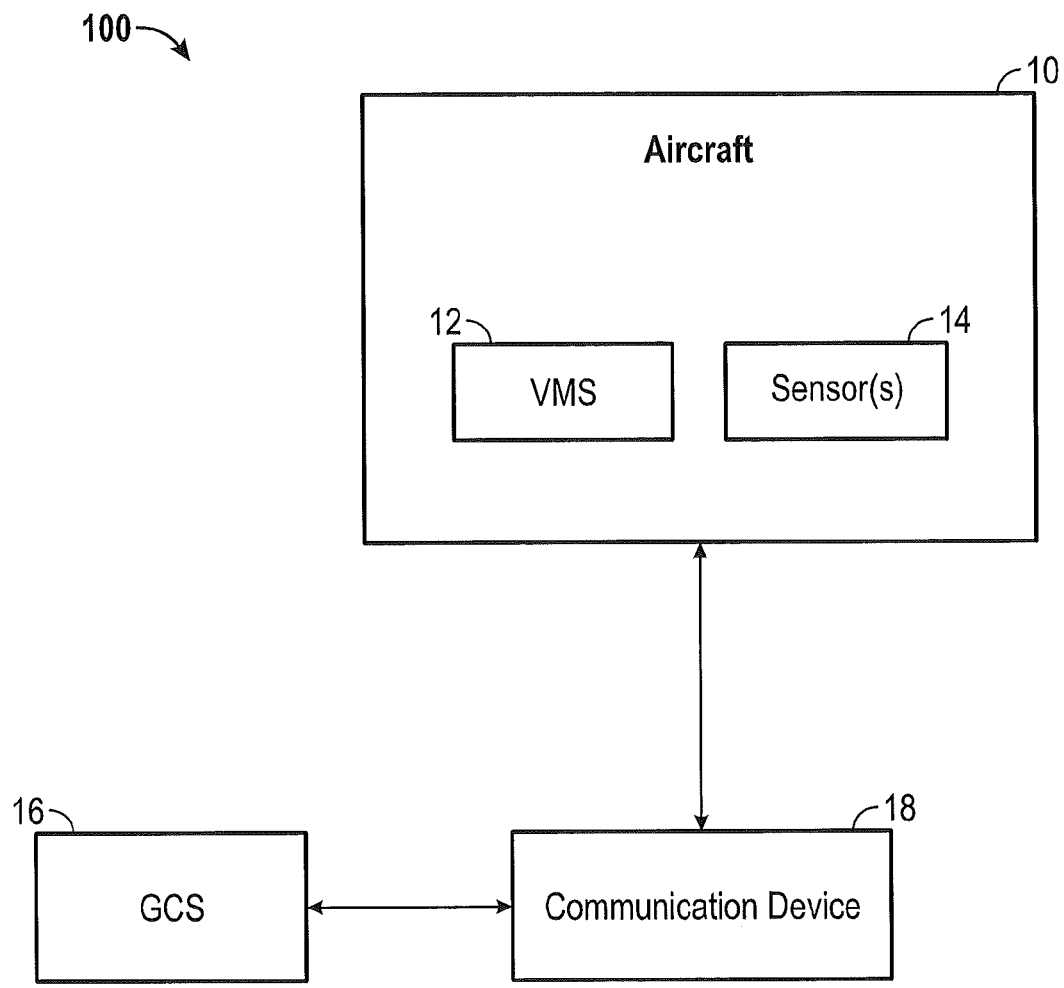
FIG. 1 illustrates an environment in accordance with one or more aspects of this disclosure.

In accordance with various aspects of the disclosure, apparatuses, systems and methods are described for enhancing the operation of an aircraft. In some embodiments, operation may be enhanced by providing an operator a vantage point from directly below the aircraft. As described herein, touch positioning may eliminate guess work for depth perception, allowing an operator to confidently position the aircraft over or away from objects on the ground. While largely described in connection with aircraft (e.g., airplanes, helicopters, etc.), the techniques and methodologies described herein may be adapted to accommodate other forms or types of vehicles. For example, the techniques and methodologies may be adapted to accommodate operations associated with marine vessels (e.g., boats, ships, yachts, submarines, etc.), automobiles (cars, trucks, etc.), etc.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this regard, a coupling of entities may refer to either a direct or an indirect connection.

FIG. 1 illustrates an environment 100 in accordance with one or more aspects of this disclosure. The environment 100 may include an aircraft 10. In some embodiments, the aircraft 10 may be, or include, an optionally piloted vehicle (OPV) or an unmanned aerial vehicle (UAV). The OPV or UAV may be configured to conduct one or more tasks or missions, such as loading or unloading supplies, equipment, etc. The aircraft 10 may include one or more components to collect or record information or data related to flight. For example, the aircraft 10 may include a vehicle management system (VMS) 12 that may be configured to collect flight status data from one or more sensors 14 included in the aircraft 10. In some embodiments, the sensors 14 include a sensor (e.g., camera 14-1 shown in FIG. 3).

The environment 100 may include a ground control station (GCS) 16 or an alternative control device. The GCS 16 may be configured to communicate with the aircraft 10. The GCS 16 may communicate commands or directives to the aircraft 10 to control the operation(s) of the aircraft 10. For example, the GCS 16 may command or direct the aircraft 10 based on parameters or criteria associated with a task or mission, based on the data collected by the VMS 12, or based on any other input factor or condition. The GCS 16 may be, or include, a server computer, a desktop computer, a laptop computer, a mobile device (e.g., a smartphone or cellphone), a PDA, MFD, etc.

The GCS 16 and the aircraft 10 may be coupled to one another and configured to communicate with one another via a communication device 18. The communication device 18 may be, or include, one or more links (e.g., data links), routers, access points, communication media, etc. The communication device 18 may be configured to communicate with the aircraft 10 and/or the GCS 16 in accordance with one or more communication types, standards, or protocols. Communications between two or more entities may be encrypted to provide privacy or secrecy.

The environment 100 is illustrative. In some embodiments, additional entities not shown in FIG. 1 may be included. In some embodiments, one or more of the entities (or portions thereof) may be optional. For example, in some embodiments the aircraft 10 may communicate directly with the GCS 16, such that the communication device 18 might not be included, or the communication device 18 may be subsumed in the GCS 16 and/or the aircraft 10. In some embodiments, the GCS 16 may be included in, or reside on, the aircraft 10.

FIGS. 2A-2D (collectively referred to as FIG. 2) illustrate windows that may be made available to an operator, such as an operator of the GCS 16 of FIG. 1. The windows may have been captured by one or more sensors, such as a video camera mounted on the belly or underside of the aircraft 10 directly over a cargo hook of the aircraft 10. The windows may have been communicated to the GCS 16 from the aircraft 10 (potentially by way of the communication device 18) in, e.g., real-time to provide a live feed from the aircraft 10 to the GCS 16.

Figure 2A:
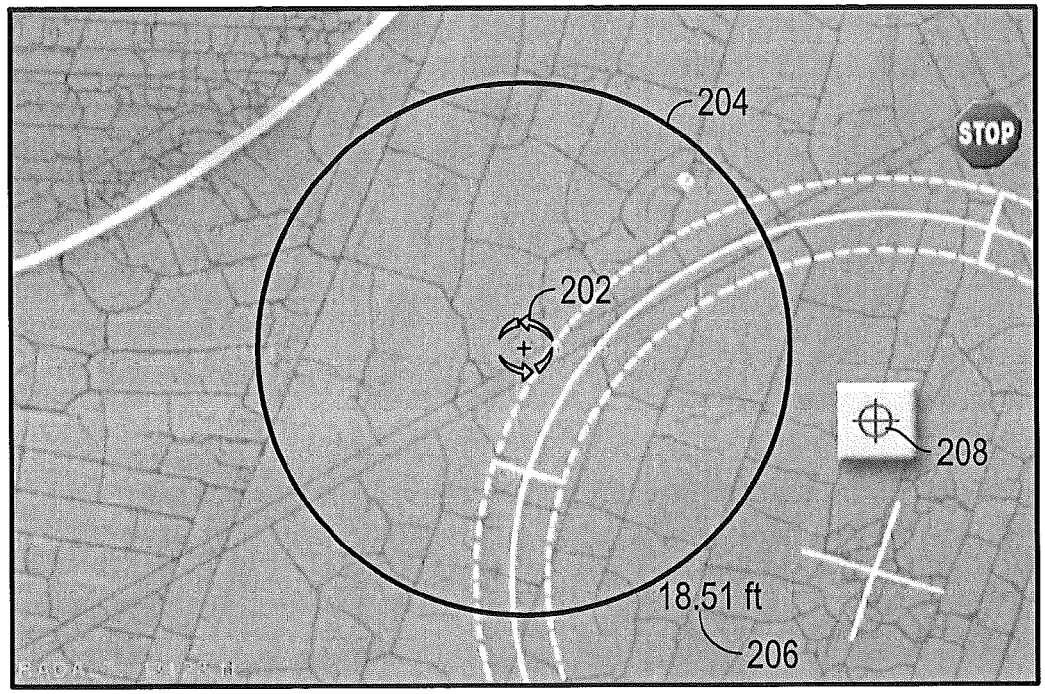
FIGS. 2A-2D illustrate exemplary windows in accordance with one or more aspects of this disclosure.

As shown in the window of FIG. 2A, the aircraft 10 may initially be located at, or proximate to, a point 202 in window of FIG. 2A. The point 202 may correspond to a loiter point, or a location of hover of the aircraft 10. The point 202 may correspond to a center of a ring 204. The ring 204 may provide an operator with a perspective of distance, much like a scale may be used in connection with a map. In some embodiments, a radius of the ring 206, which may be measured in, e.g., feet, may be displayed in the window to facilitate such perspective.

Also shown in FIG. 2A is a point 208. The point 208 may correspond to a location associated with a task or mission. For example, the point 208 may correspond to a loading (e.g., pickup) or unloading (e.g., drop-off) destination for one or more goods or products, or a landing point for the aircraft 10.

Figure 2B:
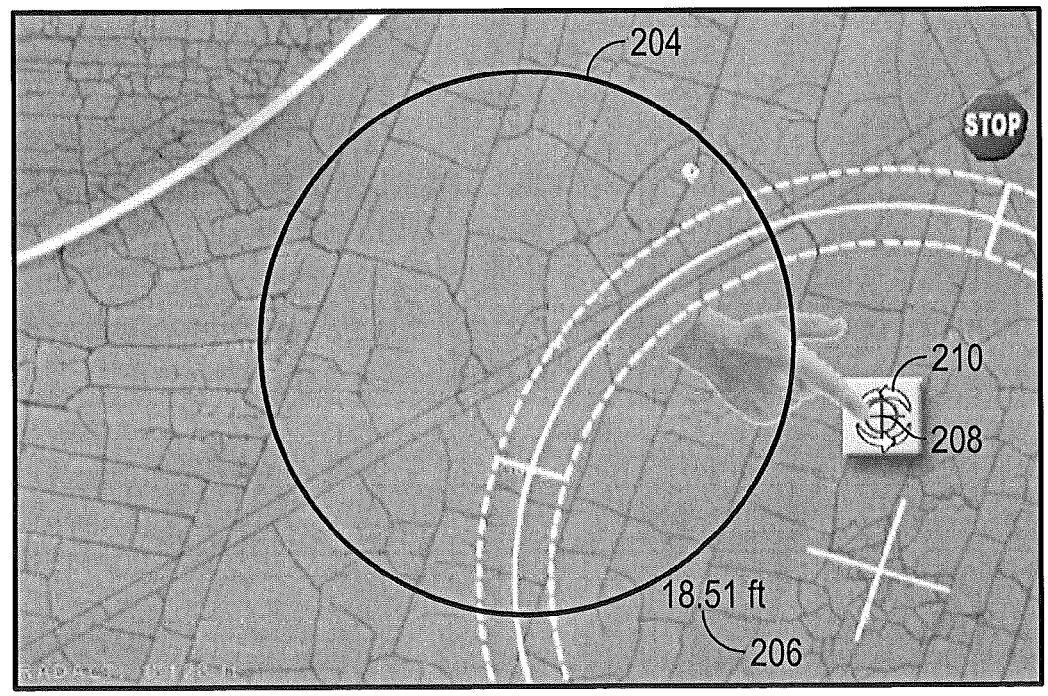

An operator of the GCS 16 may command the aircraft 10 to travel or navigate from the point 202 to the point 208. For example, as shown in FIG. 2B, the operator of the GCS 16 may depress or touch a portion of a touchscreen associated with the GCS 16 coinciding with the location of the point 208. An icon or other indicia may be displayed or overlaid on the window to signify to the operator that the command was accepted by the GCS 16. Color-coding may be used to indicate various stages of operation of the aircraft 10. For example, an icon 210 shown in FIG. 2B may take on a first color, such as a white color or appearance, to signify to the operator of the GCS 16 that the re-location command was received by the GCS 16 but has not yet been accepted by the aircraft 10.

Following receipt of the command at the GCS 16 to re-locate or re-position the aircraft 10, the GCS 16 may transmit the command to the aircraft 10, along with an identification of the desired new location for the aircraft (e.g., the location coinciding with point 208). Once the command and the new location are received by the aircraft 10 (e.g., by the VMS 12 or a flight control computer), the aircraft 10 may authenticate the command to confirm that the communication was received from a trusted source (e.g., from the GCS 16) or is a valid command. The aircraft 10 may transmit an acknowledgment message to the GCS 16 upon receipt of the command or upon the authentication of the command. Upon receipt of the acknowledgment message, the GCS 16 may change the color of the icon 210 from the first color (e.g., white) to a second color (e.g., magenta) to signify to the operator of the GCS 16 that the aircraft 10 has accepted the instruction to navigate to the new location (e.g., towards point 208).

Figure 2C:
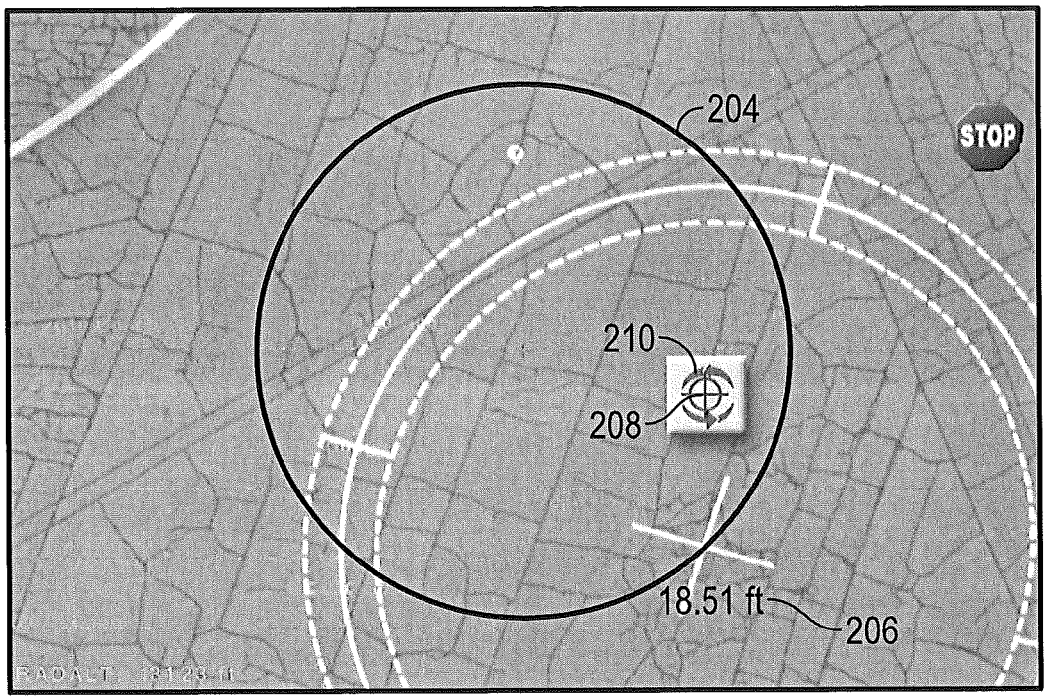

FIG. 2C illustrates a window reflecting the progress of the navigation of the aircraft 10 to the point 208. Relative to FIGS. 2A-2B, as shown in FIG. 2C, the ring 204 encloses or encompasses the point 208/icon 210, which may provide the operator of the GCS 16 with confidence that the aircraft 10 is moving in the appropriate direction (e.g., in the direction of the point 208). Moreover, the icon 210 may continue to be magenta in color in FIG. 2C to symbolize that the re-location command is active or still in progress.

Figure 2D:
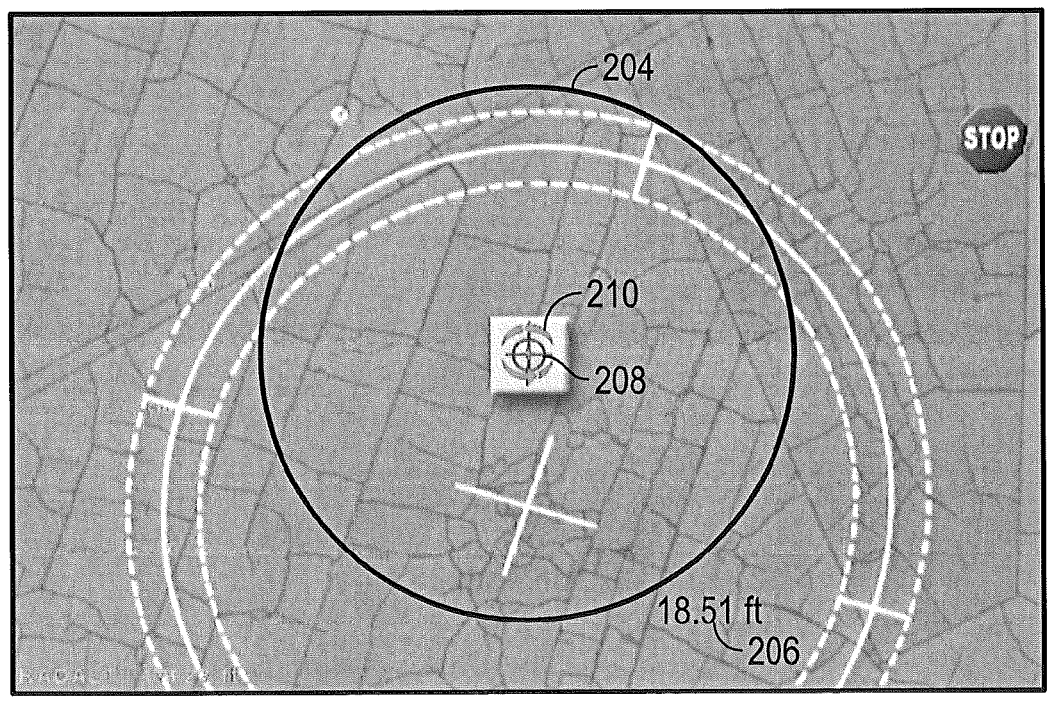

FIG. 2D illustrates a window indicative of the aircraft 10 having reached the point 208 (or a point that is proximate to point 208 within an acceptable threshold). For example, the point 208/icon 210 may be approximately centered with respect to the ring 204. In connection with the aircraft 10 having arrived at the new location, the icon 210 may change color to signify that the re-location operation is complete and that the aircraft 10 is awaiting further commands. For example, in connection with the aircraft 10 having arrived at the new location as indicated in FIG. 2D, the icon 210 may change from the second color (e.g., magenta) back to the first color (e.g., white) or to a third color (e.g., green).

Figure 3:
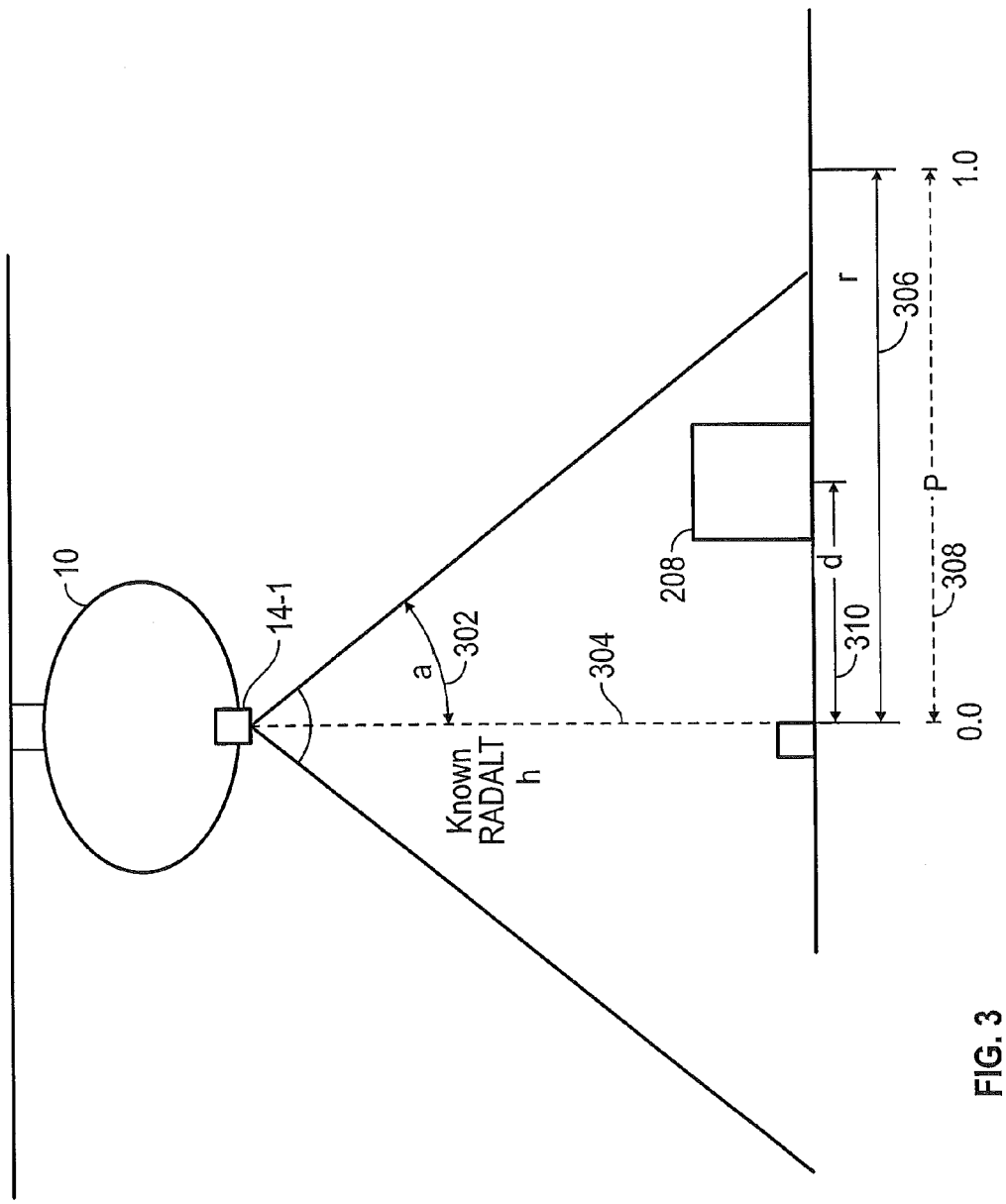
FIG. 3 illustrates exemplary parameters for calculating a distance in accordance with one or more aspects of this disclosure.

As shown in FIG. 3, the aircraft 10 may include a sensor 14-1. The sensor 14-1 may be downward-oriented, such that the footage (e.g., video or image(s)) captured by the camera 14-1 may be indicative of the ground below the aircraft 10.

The sensor 14-1 may have a known or predetermined field of view (FOV) equal to two times the parameter labeled 'a' (reference character 302) in FIG. 3, where 'a' may correspond to an angle. The aircraft 10 (e.g., the camera 14-1) may be located at a known height 'h' (reference character 304) above the ground. Based on the height 'h' (304), a radius 'r' (reference character 306) of the FOV may be calculated. For example, using geometry the radius 'r' (306) may be calculated as the product of: (1) the height 'h' (304), and (2) the tangent of the angle 'a' (302). Expressed as a formula, the calculation may correspond to: r=h×tan(a).

In FIG. 3, a parameter labeled 'P' (reference character 308) may represent a percentage (e.g., a fixed percentage) of the radius 'r' (306) corresponding to a location 'd' (reference character 310) of a new destination (e.g., point 208). Thus, taking the product of 'P' (308) and 'r' (306) will yield the distance 'd' (310) to the new location (208) as measured from an origin '0.0'. Expressed as a formula, d=P×r. The origin '0.0' in FIG. 3 may correspond to the (initial) point 202 of FIG. 2.

The calculation described above in connection with FIG. 3 to acquire the value or parameter 'd' may be conducted any number of times. For example, if a Cartesian coordinate system (e.g., X and Y axes) is used, $d_x$ and $d_y$ subcomponents of the 'd' value may be calculated in turn and then summed (e.g., via vector summation) to obtain 'd'. Other calculations may be performed. For example, a translation may be performed in a 'z' direction, wherein instead of 'd' being a percentage of 'r', dZ may be a factor of P times a fixed vertical distance.

In some embodiments, rather than simply using a coordinate system (such as a Cartesian coordinate system) to define the new location 'd', a directional or compass distance may be used. For example, the $d_x$ and $d_y$ subcomponents may be converted to, e.g., distance east and distance north based on a (north-easterly) direction in which the aircraft 10 is heading.

Still further, directional or compass distance, in potential combination with an initial position (e.g., point 202 of FIG. 2) of the aircraft 10, may be converted into coordinates for the new location of the aircraft 10 (e.g., point 208 of FIG. 2). As an example, if the initial position (e.g., point 202 of FIG. 2) of the aircraft 10 corresponds to latitude 1 ($lat_1$) and longitude 1 ($lon_1$), and the new or desired position (e.g., point 208 of FIG. 2) of the aircraft 10 corresponds to latitude 2 ($lat_2$) and longitude 2 ($lon_2$), $lat_2$ and $lon_2$ may be calculated as follows:

$$lat_2 = a\sin(\sin(lat_1)*\cos(d/R) + \cos(lat_1)*\sin(d/R)*\cos(\theta))$$

$$lon_2 = lon_1 + a\tan 2(\sin(\theta)*\sin(d/R)*\cos(lat_1), \cos(d/R) - \sin(lat_1)*\sin(lat_2))$$

where θ may be the bearing (in radians, measured from a reference direction (e.g., clockwise from north)) and d/R may be the angular distance (potentially measured in terms of radians), where d may be the distance travelled and R may be the earth's radius (where the Earth's mean radius may be equal to 6,371 km).

One or more of the conversions, calculations, or computations described above may be performed by one or more entities. For example, one or more of the calculations or computations may be performed by the aircraft 10, the GCS 16, the communication device 18, or any other component or device.

Figure 4:
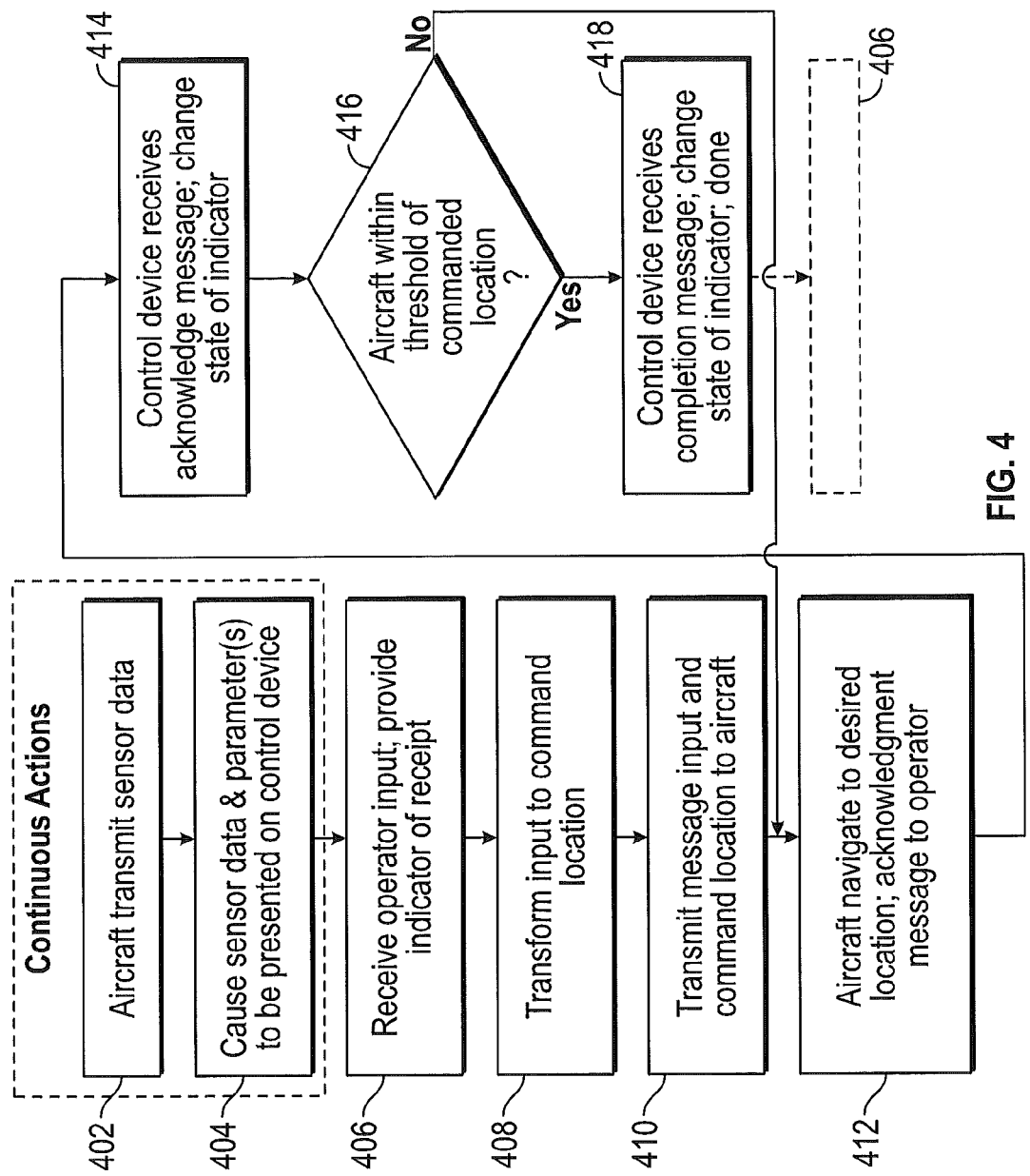
FIG. 4 illustrates an exemplary method in accordance with one or more aspects of this disclosure.

FIG. 4 illustrates a method in accordance with one or more aspects of this disclosure. The method may be used in connection with one or more apparatuses, systems, devices, or components, such as those described herein. The method of FIG. 4 may be used to direct an aircraft from a first location to a second location.

In step 402, the aircraft 10 may transmit data to one or more entities or control devices, such as GCS 16. The data may include sensor data, such as camera images or video, altitude (e.g., parameter 'h' (304) of FIG. 3), a specification of a current direction of travel of the aircraft 10, and current coordinates (e.g., latitude and/or longitude coordinates) of the aircraft 10.

In step 404, the control device may cause one or more parameters or sensor data associated with the aircraft 10 to be presented. For example, the control device may display one or more of the video or the image received from the aircraft 10, the altitude of the aircraft 10, a current hover point or location of the aircraft 10 (e.g., point 202 of FIG. 2), and a ring (e.g., ring 204 of FIG. 2).

In step 406, the control device may receive an input. The input may correspond to a command from a user or operator to re-locate the aircraft 10 from the first location to a second location. The input may be based on activation or actuation of a touchscreen, in response to a voice command, etc. As part of step 406, the control device may cause an icon (e.g., icon 210 of FIG. 2) or other indicator to be displayed or played (e.g., an audio indication) that indicates that the control device received the input.

In step 408, the input command of step 406 may be transformed into a commanded location, such as a distance 'd' (e.g., distance 'd' (310) of FIG. 3). The distance 'd' may be specified in accordance with, e.g., a coordinate system (e.g., a Cartesian coordinate system), a directional or compass distance (e.g., distance west and distance south), or a specification of coordinates (e.g., latitude and longitude).

In step 410, a specification of the input command of step 406 along with the commanded location of step 408 may be communicated from the control device to the aircraft 10 via a message.

In step 412, the aircraft 10 may receive the message of step 410. In response to receiving the message, the aircraft 10 may begin to navigate to the desired or commanded (second) location (e.g., point 208 of FIG. 2). As part of step 412, the aircraft 10 may transmit an acknowledgment of receipt of message to an operator or the control device.

In step 414, the control device may receive the acknowledgment of step 412 and modify or alter the indicator based on the receipt. For example, if an icon is used, as part of step 414 the control device may change a color of the icon from a first color (e.g., white) to a second color (e.g., magenta) in response to receiving the acknowledgment message from the aircraft 10.

In step 416, a determination may be made whether the aircraft 10 is within a threshold of a commanded location. For example, the control device may monitor the location of the aircraft 10 as it progresses from the first location (e.g., point 202 of FIG. 2) to the second location (e.g., point 208 of FIG. 2). If the aircraft 10 has not arrived at the second location ("No" path out of step 416), flow may remain at step 416 to continue monitoring the status of the aircraft's navigation, or flow may proceed (back) to step 412 as shown in FIG. 4. If, on the other hand, the aircraft 10 has arrived at the second location ("Yes" path out of step 416), flow may proceed from step 416 to step 418.

In step 418, the aircraft 10 may have arrived at the second location. In some embodiments, the control device may receive an acknowledgement or completion message as part of step 418. In response to determining that the aircraft 10 arrived at the second location, the control device may modify or alter the icon or indicator to, e.g., a third color (e.g., green). The method may end at step 418, wherein the control device may await additional commands or inputs in connection with step 406.

The method of FIG. 4 is illustrative. In some embodiments, some of the steps (or portions thereof) may be optional. Additional steps not shown may be included. In some embodiments, the method may execute in an order or sequence different from what is shown in FIG. 4. For example, steps 402 and 404 may execute more than once or continuously over the course of the method in order to provide the operator with updated or real-time data as to the progress of the aircraft's navigation from the first location to the second location.

As described herein, sensor data taken from an aircraft may be presented to an operator. The sensor data may include infrared or optical imagery, synthetic or still images, Light Detection And Ranging (LIDAR) data, Laser Detection and Ranging (LADAR) data, etc.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments of the disclosure may be implemented using one or more technologies. In some embodiments, an apparatus or system may include one or more processors, sensors, and memory storing instructions that, when executed by the one or more processors, cause the apparatus or system to perform one or more methodological acts as described herein. Various mechanical components known to those of skill in the art may be used in some embodiments.

Embodiments of the disclosure may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein. In some embodiments, the functionality described herein may be implemented in hardware, software, firmware, or any combination thereof.

Embodiments of the disclosure may be tied to one or more particular machines. For example, a control station may receive one or more inputs. The input may specify an action to be taken by a vehicle, such as an aircraft. For example, the input may serve as a command that directs the aircraft to re-locate from a first location to a second location. The input/command may be transmitted to the aircraft, such that the aircraft is directed to the second location. In some embodiments, one-touch positioning in connection with a touchscreen may be used to command an aircraft to re-locate.

Embodiments of the disclosure may transform an article into a different state or thing. For example, sensor data may be transformed into a current or first location for an aircraft. The sensor data may be presented to an operator, and the operator may be able to select an operation (e.g., a re-location operation for the aircraft from the first location to a second location) based on the sensor data.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. An apparatus comprising:
a touchscreen;
at least one processor; and
memory storing instructions that, when executed by the at least one processor, cause the apparatus to:
receive an input on the touchscreen including a command for re-location of an aircraft from a first location to a second location, the input identifying the second location,
determine at least one of a distance, a direction, and a latitude and longitude for the aircraft to travel from the first location to the second location, and
transmit the command and the at least one of a distance, a direction, and a latitude and longitude to the aircraft;
wherein the touchscreen is configured to display a map comprising an identification of the first location enclosed by a ring and a scale that provides a distance associated with the ring, the ring representing a radius on the ground, the radius varying with variations in altitude of the aircraft based on an angle of a field of view of a camera on the aircraft and the altitude of the aircraft.

2. The apparatus of claim 1, wherein the apparatus comprises a mobile device configured as a control station.

3. The apparatus of claim 1, wherein the instructions, when executed by the at least one processor, cause the apparatus to:
determine a distance for the aircraft to travel from the first location to the second location,
wherein the distance is specified by the apparatus in terms of at least one of: a Cartesian coordinate system, a directional or compass distance, and latitude and longitude coordinates.

4. The apparatus of claim 1, wherein:
the touchscreen is configured to display a map overlaid with data received from sensors of the aircraft, the data comprising an identification of the first location.

5. The apparatus of claim 4, wherein the instructions, when executed by the at least one processor, cause the apparatus to:
receive the input via a depression of a point on the touchscreen, wherein the point corresponds to the second location.

6. The apparatus of claim 1, wherein the instructions, when executed by the at least one processor, cause the apparatus to:
determine a distance for the aircraft to travel from the first location to the second location, and
calculate the distance as a percentage of the radius.

7. The apparatus of claim 1, wherein the instructions, when executed by the at least one processor, cause the apparatus to:
determine a distance for the aircraft to travel from the first location to the second location,
receive an acknowledgment of the transmission of the command and the distance, and
change the state of an indicator presented at the apparatus from a first state to a second state responsive to the received acknowledgment.

8. The apparatus of claim 7, wherein the indicator comprises an icon displayed on a display screen of the apparatus, and wherein the instructions, when executed by the at least one processor, cause the apparatus to:
receive an acknowledgement that the aircraft arrives at the second location, and
change the state of the indicator to a third state responsive to receiving the acknowledgment that the aircraft arrives at the second location.

9. A system comprising:
a control station comprising a touchscreen configured to receive a one-touch input that includes a command for re-location of at least one of an optionally piloted vehicle (OPV) and an unmanned aerial vehicle (UAV) from a first location to a second location and identifies the second location, determine at least one of a distance and new latitude and longitude for the at least one of an OPV and a UAV to travel from the first location to the second location, and transmit the command and the at least one of a distance and new latitude and longitude;
wherein the touchscreen is configured to display a map comprising an identification of the first location enclosed by a ring and a scale that provides a distance associated with the ring, and wherein the second location is associated with at least one of: a loading or an unloading destination for one or more goods or products or a landing point for the at least one of an OPV and a UAV, and
wherein at least a portion of an indicator overlaid on top of the map is configured to change from a first color to a second color responsive to the control station receiving an acknowledgment of the transmission of the command and the at least one of a distance and new latitude and longitude, and wherein at least a portion of the indicator is configured to change from the second color to a third color responsive to acknowledgment that the at least one of an OPV and a UAV arrives at the second location.

10. The system of claim 9, further comprising:
a communication device configured to receive the command and the at least one of a distance and new latitude and longitude from the control station and transmit the command and the at least one of a distance and new latitude and longitude to the at least one of an OPV and a UAV.

11. The system of claim 9, wherein the control station comprises a control device configured to display data received from one or more sensors of the at least one of an OPV and a UAV, the data comprising a camera image or video captured by the at least one of an OPV and a UAV, altitude of the at least one of an OPV and a UAV, a specification of a current direction of travel of the at least one of an OPV and a UAV, and latitude and longitude coordinates of the at least one of an OPV and a UAV when at the first location.

* * * * *